CLAUDE W. PARRISH
THOMAS F. ORMSBY
INVENTORS.

BY
*Wayland D. Keith*
THEIR AGENT

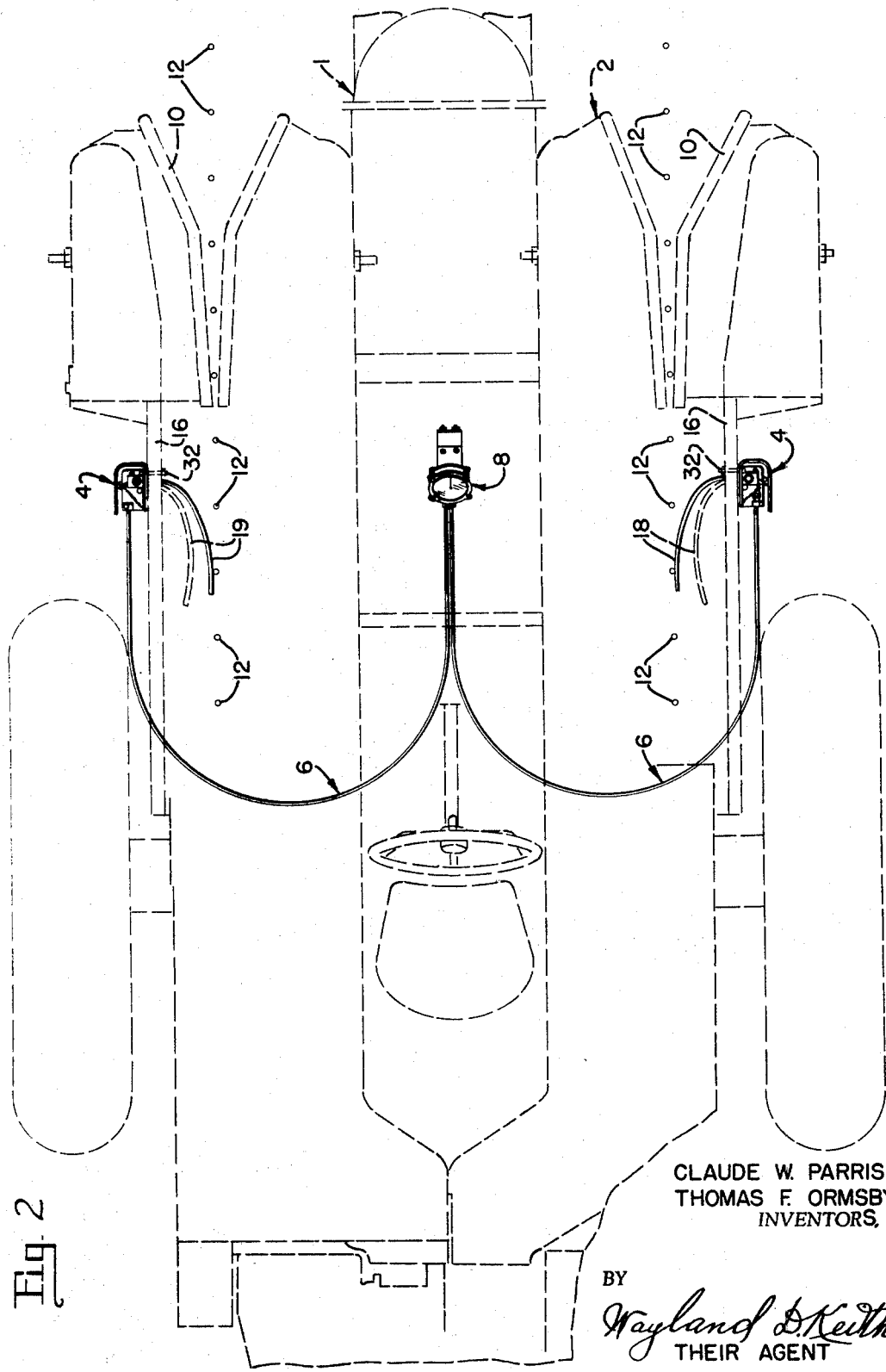

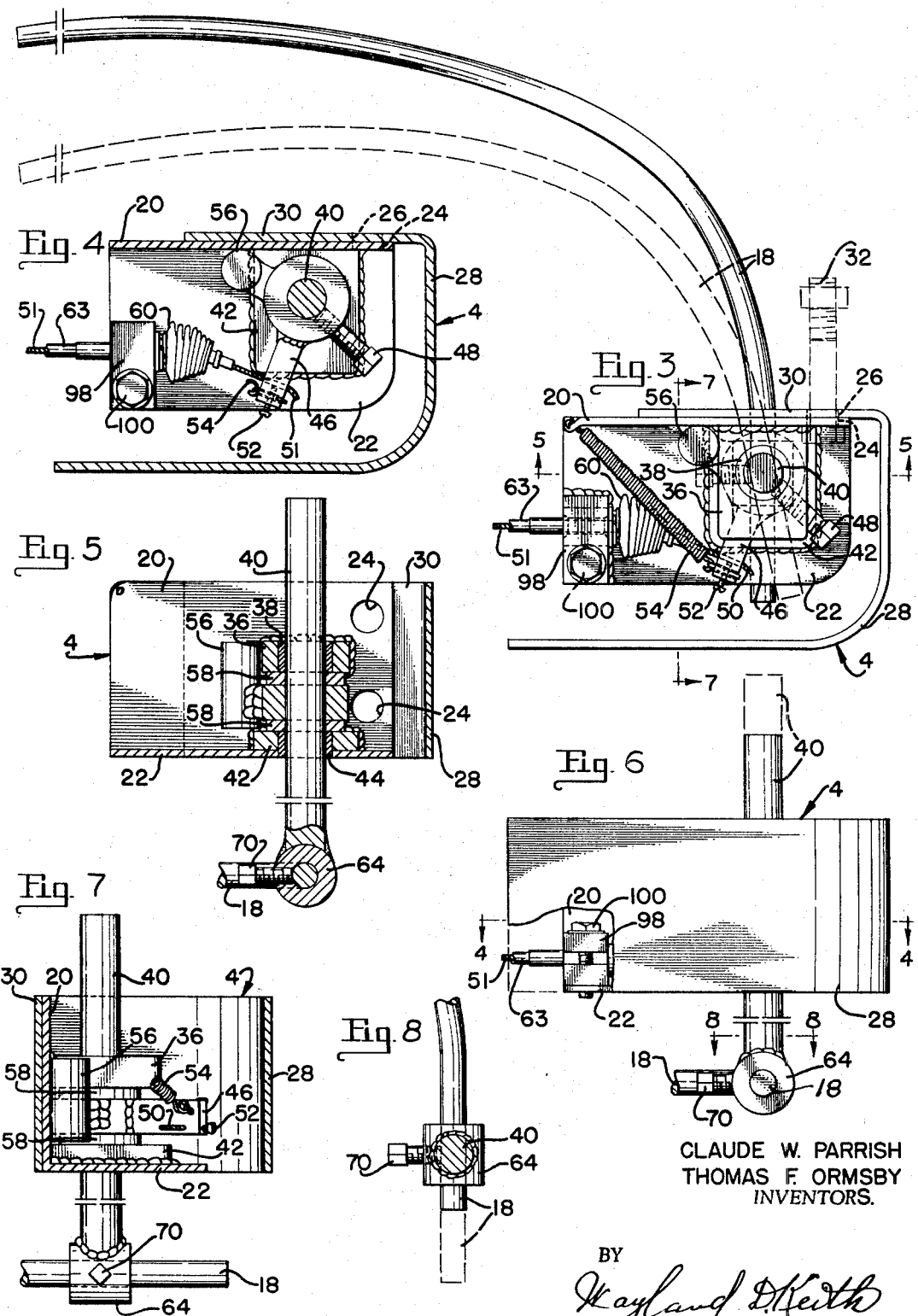

July 16, 1968  C. W. PARRISH ET AL  3,392,697
STALK ACTUATED POSITION INDICATOR FOR ROW IMPLEMENTS
Filed Oct. 12, 1965  4 Sheets-Sheet 4
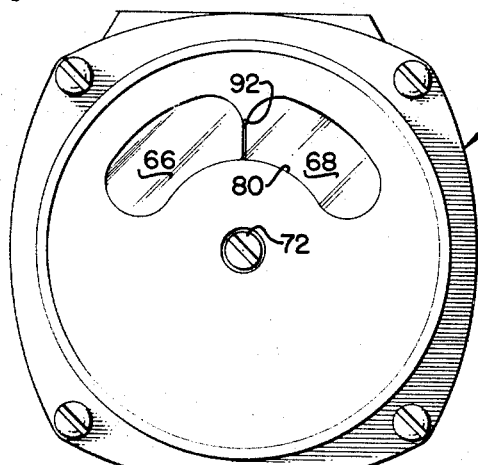
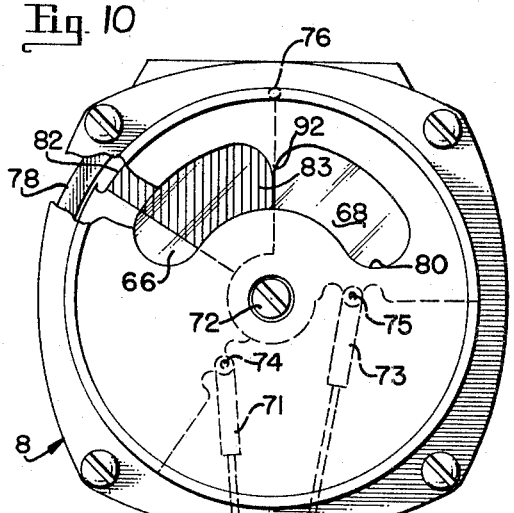
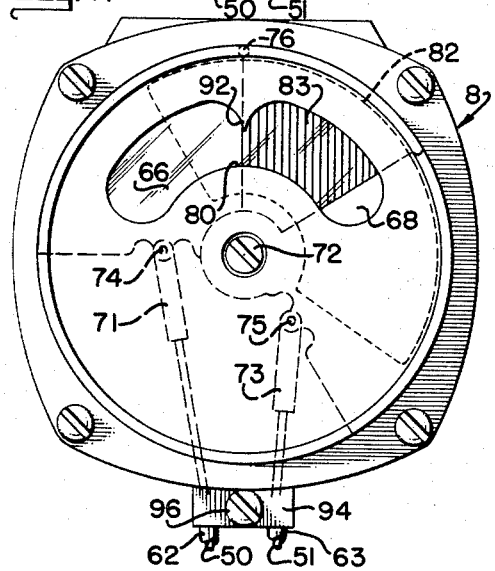
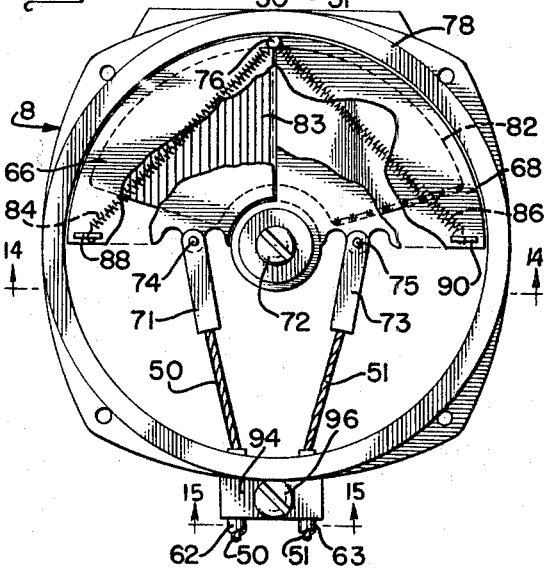
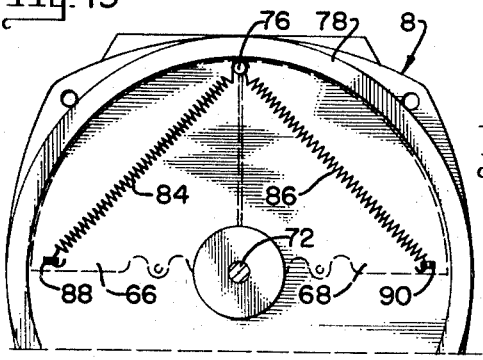
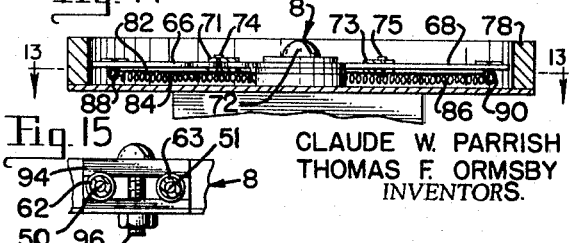
CLAUDE W. PARRISH
THOMAS F. ORMSBY
INVENTORS.
BY
Wayland D. Keith
THEIR AGENT United States Patent Office 3,392,697
Patented July 16, 1968

3,392,697
STALK ACTUATED POSITION INDICATOR FOR ROW IMPLEMENTS
Claude W. Parrish, Rte. 1, and Thomas F. Ormsby, 2908 W. 11th St., both of Plainview, Tex. 79072
Filed Oct. 12, 1965, Ser. No. 495,256
7 Claims. (Cl. 116—124)

ABSTRACT OF THE DISCLOSURE

An apparatus for sensing the relative position of a row implement to a row of stalks so that the sensing rods or feelers will engage one or more rows of stalks and thus mechanically actuate a visual indicator positioned forward of the operator. This permits the row implement to be steered in such a manner so as to maintain it in the correct position relative to the row or rows of stalks.

---

This invention relates to improvements in stalk actuated position indicator for agricultural row implements. Various row crops require that a farm implement be guided along a row within very close tolerances, or the effective use of the implement is impaired. The present device is so constructed that an operator may actually determine the position of the farm implement relative to the rows of stalks without being able to see or look at the base of stalks around which the farm implement is operating.

Various farm implements, such as cotton strippers, cotton pickers, corn gatherers, and various tilling plows and flame cultivators, require that the implement be guided within very close tolerances or damage can be done to the plants, thereby the yield is greatly impaired.

The present device is so constructed that a relatively inexperienced implement operator may till the soil in which the row crops are planted, and furthermore may gather the crops by use of the present device, as the present machine may be manually steered in accordance with indicator elements, which enables much greater speed to be had with the implement, and a greater yield had from the farm products tilled and harvested with implements, and gathered by devices which use the present stalk actuated position indicator.

The present stalk actuated position indicator is shown to be installed on a cotton stripper, which stripper is mounted on a farm tractor. This mounting is for the purpose of illustrating the use of the stalk actuated position indicator on an agricultural row implement, and it is to be understood that the device may be any type implement to which it is applicable.

An object of this invention is to provide a stalk actuated position indicator for an agricultural row implement, which indicator will enable the operator of the implement or harvester to know exactly the position of the implement or harvester with respect to the rows, whether used on a single row implement or a multi-row implement.

Another object of the invention is to provide a positon indicator which will accurately convey, to the operator, the movements necessary to the implement to enable the implement to be brought in correct position with respect to the row or rows being acted upon.

Another object of the invention is to provide a row indicator which will enable the implement to be maintained in such manner that the plows will be a spaced distance from the stalk and roots of the plants being cultivated.

Still another object of the invention is to provide a stalk actuated position indicator for agricultural row implements such as cotton strippers, cotton pickers, corn gatherers and husking harvesters, and other harvesters which must be maintained in aligned relation with the row or rows being acted upon by the harvester.

Yet a further object of the invention is to provide a stalk actuated position indicator which is easy to operate, easy to assemble and disassemble, which is readily adjustable, and which is low in the cost of manufacture.

With these objects in view and others which will become apparent as the description proceeds, reference is to be had to the accompanying drawings in which like reference characters designate like parts in the several views thereof, in which:

FIG. 2 is a top plan view of the tractor and cotton stripper, as shown in FIG. 1, with the tractor and cotton stripper being shown in dashed outline, and showing the stalk actuated position indicator for the agricultural row implement in full outline, the feeler rods thereof being shown in an alternate position in dashed outline;

FIG. 3 is an enlarged top plan view of the stalk feeler rod and associated mechanism, which is attached to the cotton picker in close proximity to one side of the row of stalks being acted upon, with a portion broken away and showing the rod in an alternate dashed outline position;

FIG. 4 is a fragmentary sectional view of a portion of the mechanism as shown in FIG. 3, taken on line 4—4 of FIG. 6;

FIG. 5 is a sectional view taken on line 5—5 of FIG. 3, looking in the direction indicated by the arrows, to show details of the mechanism;

FIG. 6 is an elevational view of the stalk engaging mechanism with parts broken away, shortened, and shown in section, an alternate position being shown in dashed outline;

FIG. 7 is a sectional view taken on line 7—7 of FIG. 3, looking in the direction indicated by the arrows, with parts broken away and shortened;

FIG. 8 is a sectional view taken on line 8—8 of FIG. 6, looking in the direction indicated by the arrows;

FIG. 9 is an elevational view of the visual indicator which is associated with and connected to the stalk actuated mechanism, as shown in FIGS. 3 through 7, showing the visual indicator in position to indicate the implement or harvester to be in the correct position with respect to the row being acted upon;

FIG. 10 is a view similar to FIG. 9, but showing the visual indicator indicating that the implement or harvester has engaged the stalks on the left hand row, as shown in FIG. 2, and that the implement needs to be pulled to the right to center it or the harvester in aligned relation with the row being acted upon;

FIG. 11 is a view similar to FIG. 10, but showing the indicator on the right hand side of the implement, showing red in the window behind an arcuately movable masking disc segment, in which instance the tractor will need to be pulled to the left to cause the realignment of the implement with the row;

FIG. 12 is a view similar to FIG. 9, but with the cover and sight glass removed, to show the arcuate, rotatable masking disc segments in zero indicated position, showing portions of the disc segments broken away to show the details of construction, and to show a color segment attached to one of the disc segments;

FIG. 13 is a sectional view taken on line 13—13 of FIG. 14, looking in the direction indicated by the arrows;

FIG. 14 is a sectional view taken on line 14—14 of FIG. 12, looking in the direction indicated by the arrows, with the cover removed; and FIG. 15 is a sectional view taken on line 15—15 of FIG. 12, looking in the direction indicated by the arrows.

Figure 1:
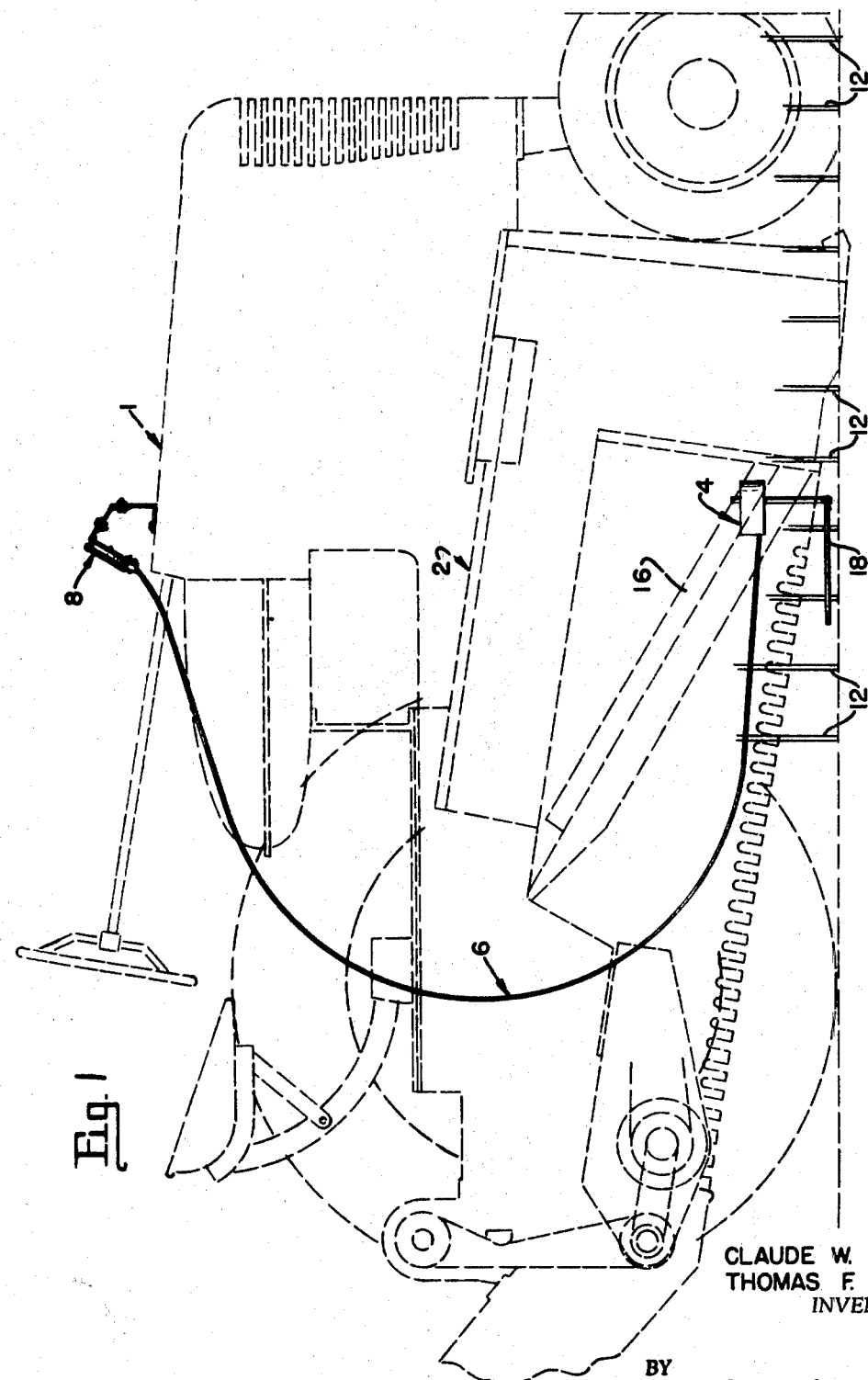
FIG. 1 is a side elevational view of a tractor showing an agricultural row implement, such as a cotton stripper, installed thereon, and showing the stalk actuated position indicator for agricultural row implements attached to the cotton stripper, with the tractor and cotton stripper being shown in dashed outline.

With more specific reference to the drawings, the numeral 1 designates generally a tractor element having an implement 2 mounted thereon, which, in the present instance, is indicated as a cotton stripper. However, it is to be understood that the implement need not be limited to cotton strippers or to other particular implements, but as a matter of brevity, the reference made to implements hereafter shall be interpreted to include implements for tilling or harvesting row crops. The numeral 4 designates generally a stalk actuated sensing mechanism which is installed on the implement near the ground, so as to be in contact with and responsive to the stalks of the plants in the rows. The numeral 6 designates a cable and housing assembly which is operatively connected, at one end thereof, to the stalk actuated sensing mechanism 4, at the other end of the cable and housing assembly, to a visual indicator, designated generally by the numeral 8, which visual indicator is in a position so as to be readily viewed by the operator, such as on the top or hood of the tractor 1. An implement 2 is positioned on each side of the tractor 1 so that the respective throats 10 of the implement will guide stalks 12 thereinto for an operation, such as tilling or gathering, which in the present instance is the gathering bolls of cotton from the cotton stalks. As the implement 2 progresses, a stalk actuated sensing mechanism 4 is positioned on a mounting bar 16 on the frame of implement 2, which stalk sensing mechanism 4 senses the relative position of the throat of the implement with respect to the row of stalks 12 in accordance with the path traversed by sensing rods or feelers 18 and 19. The rods or feelers 18 and 19 extend inward towards each other and are curved rearwardly so the sensing rods 18 and 19 will transmit an indication of the position of the implement with respect to the row or rows.

The stalk sensing mechanisms 4 each comprise a mounting member which has an upstanding angle plate 20 and a horizontal base 22, as will best be seen in FIGS. 3 through 7. Each upstanding angle plate 20 has holes 24 formed therethrough, which holes are adapted to register with holes 26 in each complementary protector shield 28. Each protector shield 28 has a flat plate 30 positioned intermediate the inner face of each upstanding angle plate 20 and each mounting bar 16 on implement 2. Bolts are positioned through holes 24 and mounting bar 16 on each side of implement 2 to hold each stalk actuated mechanism 4 in secure relation with respect to the implement 2.

Each upstanding angle plate 20 has an outwardly extending apertured lug 36 thereon, each lug 36 preferably has a bushing 38 therein in which to journal a vertical shaft 40. An outwardly extending apertured lug 42 is positioned below each lug 36 and is secured to or made integral with each upstanding angle plate 20. Each lug 42 also extends outward and is secured to or made integral with each horizontal base 22, with the apertures in the lugs 36 and in lugs 42 being in axial alignment. A bushing 44 is positioned within each lug 42 to journal the lower portion of the respective shafts 40. An apertured lever 46 is secured to each shaft 40 by means of set screws 48, as will best be seen in FIG. 4. An aperture is formed in each lever 46, with the respective cables 50 and 51 passing through the respective apertures, which cables are clamped in place by set screws 52. A spring 54 biases each lever 46, so as to rotate the respective levers 46 and the respective shafts 40 about the respective axes, under normal conditions, until an outstanding abutment 56, on each of the levers 46, abuts with the inner face of the respective upstanding angle plates 20. Thrust discs or washers 58 are positioned above and below the abutment 56 on the respective levers 46, so as to fix the respective levers 46 against longitudinal movement, yet each lever 46 will be free to rotate arcuately with the respective shafts 40.

The respective cables 50 and 51 are connected to and extend through accordion type elastomer boots 60, which cables extend into the respective guide housings 62 and 63 of the cable and housing assembly 6, with the cables 50 and 51 each terminating in the housing of the visual indicator 8.

Each of the shafts 40 may be moved vertically, as indicated in FIG. 6, by loosening the respective screws 48. The lower end of each shaft 40 has an eye 64 formed therein, and a feeler rod 18 or 19 extends through the respective eyes 64 and each feeler or rod extends inward and is curved rearwardly, as indicated in FIGS. 2 and 3. Upon an implement 2 moving along a row of stalks, as indicated at 12, when the feeler rods 18 or 19, engages a stalk or stalks, the respective vertical shafts 40 will be moved arcuately from the position shown in full lines to the positions shown in dashed outline in FIGS. 2 and 3, which in turn will move levers 46 mounted on the respective shafts 40, arcuately. This will move cable 50 or cable 51 longitudinally within housing 62 or 63 to actuate movable elements 66 or 68 in visual indicator 8, as will be more fully brought out hereinafter.

The feeler rods 18 and 19 may be moved longitudinally within eye 64, as indicated in FIG. 8, upon the loosening of a set screw 70. Upon the feeler rods 18 or 19 being adjusted to the correct position, the set screw 70 is tightened.

The visual indicator 8 has the movable indicator elements 66 and 68 thereof pivotally mounted on an axial bolt 72. The movable indicator element 66 is a segment of a disc of approximately ninety degrees, which indicator element is operatively connected to the pull cable 50 by means of a clevis 71 and a pivot pin 74, which pivot pin passes through an aperture in the lower portion of the movable, segmental element 66. A complementary segmental disc indicator 68 is also pivotally mounted on axial bolt 72 and is movable by a pull cable 51 which is connected to a clevis 73, which clevis is pivotally connected to the lower side of movable indicator element 68 by a pivot pin 75, which pivot pin passes through apertures in the clevis and an aperture in the lower edge of movable indicator element 68. A stop pin 76 is fitted within the housing 78 near the upper side thereof, which stop pin serves as an abutment or stop for the movable indicator elements 66 and 68, whereby these elements will substantially cover the area of a sight window 80, when the implement 2 is being guided in the correct relation with respect to the stalks in rows 12.

The movable indicator element 68 has an underlying disc segment portion 82 secured thereto, which disc segment is of sufficient arcuate length, with respect to the axis of pivot pin 72, that it underlies more than half of the sight window 80. The movable indicator elements 66 and 68 are normally maintained in position, as indicated in FIGS. 9 and 12, by the respective tension springs 84 and 86, the spring 84 is biased between stop pin or abutment 76 and an anchor point 88 on the lower side of movable indicator element 66, as will best be seen in FIGS. 12, 13 and 14. The movable indicator element 68 has the spring 86 biased between upstanding pin or abutment 76 and an anchor point 90 on the lower side of movable indicator element 68, as will best be seen in FIGS. 12, 13 and 14.

The pull cables 50 and 51 are freely slidable within the respective guide cable housings 62 and 63, and the spring 54 normally maintains a feeler rod or sensing bar, such as 18, in the full outline position indicated in FIG. 3, to urge cable 51 upward toward visual indicator 8. The spring 86 will serve to maintain the movable indicator element 68 in the position as shown in FIGS. 9, 10, and 12. When the feeler or sensing rods 18 and 19 are in the position as shown in full outline in FIG. 2, the movable indicator elements 66 and 68 will be in the position as indicated in FIGS. 9 and 12. However, if either of the sensing rods 18 or 19 engage stalks 12, as by the implement 2 moving from a direct, straight ahead course, the rod 18, if moved outwardly, will exert a pull on cable 50, which cable will move indicator element 66 to the left, as indicated in FIG. 6, which will expose a colored portion 83 of disc segment 82 to the degree the feeler rod 18 engages the stalks. The driver of the tractor 1 propels the implement 2 across a field, will be given a visual warning that the implement is veering to the right, whereupon, the tractor can be steered to the left until the movable indicator element 66 comes to rest in the center point 92 in the sight glass 80. The disc segment 82 was static while movable indicator element 66 moved to expose the colored portion 83 thereof.

If the implement 2 veers to the left, the stalk engaging feeler or sensing rod 18 will engage stalks 12 and be moved from the full outline position as shown in FIG. 2 to the dashed outline position shown therein, whereupon, the movable indicator element 68 and disc segment 82, attached thereto, will be moved to a position as shown in FIG. 11, by the stalk engaging feeler or sensing rods 19 and 18 rotating shafts 40 and levers 46 to exert a pull on pull cables 50 and 51, against tension of springs 84 and 86, which movement will expose a colored portion 83 within sight window 80, as the colored portion 83 of disc segment 82 is attached to and is movable with indicator element 68, when the cable 51 moves the movable indicator element 68.

The cable housings 62 and 63, respectively, are clamped to housing 8 by means of a clamp 84 and screw bolt 96, as will best be seen in FIGS. 11 and 15. The other end of the respective cable housings 62 and 63 is secured to the respective base plates 22, by respective clamp 98 and screwthreaded bolt 100.

*Operation*

With a stalk actuated row sensing mechanism 4 positioned on each side of the implement 2, and with the sensing rods or feelers 18 and 19 so adjusted that there will be a slight clearance between these rods or feelers and the stalks of the rows 12, as shown in FIG. 2, and with the movable indicator elements 68 and 66 adjusted to be in abutting relation with stop pin or abutment 76, the implement 2, such as a tilling implement, or a harvester, such as a cotton stripper, cotton picker, corn picker or the like, as indicated at 2, is guided between rows, as indicated in FIG. 3, so that the stalks 12 of the row will feed through the open throat of the implement in centered relation, thereby to enable the proper action by the implement, whether to till the soil around the stalks, or for the implement to be so guided, if a harvesting operation is being performed, that the bolls, pods, ears or the like, are acted upon to give maximum action of the harvesting implement being used. However, in so doing, it is most essential that the stalks 12 are properly guided through the throats 10, to obtain the proper harvesting action.

If the tractor 1 and implement 2 veer to either side of the prescribed path, the sensing or feeler rods 18 and 19 will engage the respective left and right rows 12, FIG. 2, to cause the respective movable indicator elements 68 or 66 to move from the central position, as shown in FIG. 9, which, in either case, will expose a colored portion 83 of the disc segment 82, which will warn the operator that the implement is off course and in which direction, so the tractor and implement may be guided in the proper direction so that the movable indicator elements 68 or 66 will move into the position as shown in FIG. 9. If the stalks of the right hand row engage the sensing or feeler rod 18, the indicator element 68 will be moved to the right, which will indicate that the tractor is off course to the left, and by watching the indicator element 68, the tractor may be steered on the correct course, without looking back at the rows over which the inplement is passing.

The portion 83 of the disc segment 82 is painted red to indicate danger, and divergence of either movable element 66 or 68 will promptly bring the visual warning to the attention of the operator.

The particular advantage of the present device is that it enables a tractor mounted implement to be accurately steered along rows where the foliage of the crop is so rank and dense that the stalks actually cannot be seen near or at the base thereof. The present device enables the operator to steer the tractor by remote, visual indicators more accurately than it can be done by observing the relation of the implement and tractor to the respective rows.

Having thus clearly shown and described the invention, what is claimed as new and desired to be secured by Letters Patent is:

1. A stalk actuated position indicator for use with row implements to indicate the position of the implement with respect to a row of plants, which indicator comprises;
    (a) a stalk sensing mechanism,
        (1) a stalk sensing element extending outwardly and rearwardly from said stalk sensing mechanism, and adapted to be mounted in close proximity to the ground for engagement with the stalks near the ground level,
    (b) a visual indicator associated with the implement,
    (c) a movable element mounted within said visual indicator,
    (d) lineally movable mechanical means operably connecting said stalk sensing element with said visual indicator to move said visual indicator in response to the lateral movement of said implement with respect to the row of plants.

2. A stalk actuated position indicator for use with row implements to indicate the position of the implement with respect to a row of plants, which indicator comprises;
    (a) a stalk sensing mechanism,
    (b) an upright shaft pivotally mounted on said stalk sensing mechanism for movement with respect to a vertical axis,
    (c) a stalk sensing rod mounted on said upright shaft and extending laterally outward therefrom and being movable therewith and being a spaced distance upward from the ground for engagement with the stalks of said row of stalks,
    (d) a lever mounted on said upright shaft and being movable therewith,
    (e) slidable cable means connected to said lever and extending outward therefrom,
    (f) a visual indicator associated with said implement to indicate the position of the implement with respect to the row of plants,
    (g) a movable indicator element mounted within said visual indicator,
    (h) said slidable cable means operatively interconnecting said lever, on said upright shaft, and said movable indicator element, within said visual indicator.

3. A stalk actuated position indicator for use with row implements to indicate the position of the implement with respect to a row of plants; as defined in claim 2; wherein
    (a) said stalk sensing rod extends horizontally and laterally with respect to the axis of said upright shaft, and which stalk sensing rod extends rearwardly with respect to the line of travel of the implement.

4. A stalk actuated position indicator for use with row implements to indicate the position of the implement with respect to a row of plants, as defined in claim 2; wherein
    (a) said shaft is slidable vertically within said stalk sensing mechanism, and (b) set screw means for maintaining said shaft in adjusted relation with respect to said sensing mechanism.

5. A stalk actuated position indicator for use with row implements to indicate the position of the implement with respect to a row of plants, as defined in claim 2; wherein
   (a) said sensing rod, which extends laterally outward from said shaft, being slidable laterally with respect to the axis of said shaft, and
   (b) means fixedly securing said sensing rod in secure relation with respect to said upright shaft.

6. A stalk actuated position indicator for use with row implements to indicate the position of the implement with respect to a row of plants, which indicator comprises;
   (a) a stalk sensing mechanism,
   (b) an uprigth shaft pivotally mounted on said stalk sensing mechanism for movement about a vertical axis,
   (c) a stalk sensing rod mounted on said upright shaft and extending laterally outward therefrom and being movable therewith, and being located a spaced distance upward from the ground for engagement with the stalks of said row of plants,
   (d) a lever mounted on said upright shaft and being movable therewith,
   (e) slidable cable means connected to said lever and extending outward therefrom,
   (f) a visual indicator associated with said implement to indicate the position of the implement with respect to said row of plants,
       (1) said visual indicator having a housing,
       (2) said visual indicator having an arcuately movable indicator element pivotally mounted on the housing thereof,
       (3) a window in said housing exposing at least a portion of said visual indicator, and
       (4) said slidable cable means operatively interconnecting said lever, on said upright shaft, and said movable element, within said housing of said visual row indicator.

7. A stalk actuated position indicator for use with row implements to indicate the position of the implement with respect to a row of plants, which position indicator comprises;
   (a) a pair of stalk sensing mechanisms,
   (b) an upright shaft pivotally mounted on each said stalk sensing mechanism for movement with respect to the respective vertical axes,
   (c) a stalk sensing rod mounted on each said upright shaft and extending laterally outward therefrom and being movable therewith,
   (d) a lever mounted on each said upright shaft and being arcuately movable therewith,
   (e) slidable cable means connected to each said lever and extending outward therefrom,
   (f) a visual indicator associated with the implement to indicate the position of the implement with respect to each row,
       (1) said visual indicator having a housing,
       (2) a pair of arcuately movable indicator elements pivotally mounted on said housing for swinging movement,
       (3) a window within the body of said housing exposing a portion of each arcuately movable indicator element when said arcuately movable indicator elements are in one position,
       (4) means mounted on one of said arcuately movable indicator elements and underlying the other of said arcuately movable indicator elements so when either of said arcuately movable elements are moved about the axis thereof, said underlying element will be exposed to indicate the relative position of the implement with respect to the row of plants, and
   (g) said slidable cable means operatively interconnecting said lever, on said upright shaft, and said movable indicator elements, mounted in the housing of said visual indicator.

References Cited
UNITED STATES PATENTS

| | | | |
|---|---|---|---|
| 495,047 | 4/1893 | Knowles | 116—126 |
| 2,929,457 | 3/1960 | Langerak | 116—124 XR |

DAVID SCHOENBERG, *Primary Examiner.*

LOUIS R. PRINCE, *Examiner.*

J. W. ROSKOS, *Assistant Examiner.*